Patented Jan. 20, 1948

2,434,764

UNITED STATES PATENT OFFICE 2,434,764

CALCIUM CADMIUM MOLYBDATE PHOSPHOR

Herman C. Froelich, Cleveland, and Ann R. Hersey, Shaker Heights, Ohio, assignors to General Electric Company, a corporation of New York No Drawing. Application August 30, 1943, Serial No. 500,562

1 Claim. (Cl. 252—301.6)

This invention relates to a combination of a luminescent material or phosphor with a source of exciting radiation, and particularly to a new phosphor. Phosphors consist in general of a major proportion of a so-called base material or matrix and a minor proportion of another material called an activator. Several activators may coact in the fluorescence of a phosphor, and may co-operate to produce effects which could not be expected from the emissions which they would produce singly in a given matrix material. The radiation of a phosphor when excited depends on the relations between matrix and activator materials, as largely determined by heat-treatment which they undergo together, as well as on the materials themselves and their relative proportions. Apparently it is the metal of an activator material that determines its effect in a phosphor, although this metal is usually present as a compound.

We have found valuable material for phosphor in calcium and cadmium molybdate, which can be cofired and activated with metal of the group comprising lead and samarium to give good fluorescent brightness, and to control or vary the luminescent color. Similar qualitative results can be obtained by cofiring with calcium molybdate various other cadmium compounds, particularly oxides and oxide-yielding compounds, although the brightness has not proved so good as when cadmium molybdate is used. The phosphor responds strongly to excitation by long-wave ultraviolet radiation, such as 3650 Å., less strongly to cathode rays, and only weakly to short-wave ultraviolet such as 2537 Å. Activated with lead alone, the phosphor gives a yellow fluorescence which can be made free of any apparent green undertinge; with increasing amounts of samarium as an additional activator, the color shifts to orange of deeper and deeper shades, and then to red; with samarium alone as activator, the fluorescent color is decidedly red. The phosphor is remarkable for its stability under rising temperature: e. g., it is brightly fluorescent even above 200° C., where most other phosphors would be nearly extinct. However, the color is redder at the higher temperatures.

The relations of calcium and cadmium compounds in the phosphor are evidently more intimate than a mere mixture; and the fact that calcium molybdate and cadmium molybdate apparently both crystallize in the tetrahaedral system leads to the opinion that they are combined as mixed crystals. Whatever the exact interrelations of these components in the complex which they form, the relative proportions of calcium molybdate and cadmium compound are not highly critical; for the changes in color quality of fluorescence and the increase in brightness are gradual from a greenish yellow with no cadmium to a pure yellow with a 1:5 mol ratio of cadmium molybdate ($CdMoO_4$) to calcium molybdate ($CaMoO_4$), which is about the optimum. However, the proportion of cadmium can be made considerably higher than this, with only moderate loss of brightness and increase in cost of material, up to about a 1:2 mol ratio of cadmium molybdate to calcium molybdate. These high proportions of cadmium compound (amounting to some 40 per cent by weight) indicate that its role is that of an influential component of a complex matrix, rather than that of activator pure and simple. With any substantially higher proportion of cadmium than above indicated, however, there seems to be a partial decomposition of cadmium molybdate, $CdMoO_4$, to yield dark brown cadmium oxide, $CdO$, which objectionably discolors the phosphor as looked at by daylight.

The proportions of activating lead or samarium in the phosphor are not highly critical. For lead, there is a gradual increase in brightness of the phosphor from 0.1 per cent by weight of lead molybdate ($PbMoO_4$) in the phosphor up to some 5 to 10 per cent, which is about the optimum, though amounts as high as 20 per cent have been used with only moderate reduction in brightness. For samarium as an additional activator, besides lead, there is a gradual change through deeper and deeper shades of orange and of red from 0.1 per cent by weight of samarium molybdate, $Sm_2(MoO_4)_3$, to 1 per cent and higher. It is of interest that lead molybdate crystallizes in the tetrahaedral system, like calcium and cadmium molybdates, while samarium molybdate crystallizes in the rhombic system.

Preferably all the components of the phosphor are in the form of molybdates, although cadmium oxide is serviceable and convenient instead of cadmium molybdate as an ingredient or component of the phosphor, and lead oxide with a flux has been used instead of lead molybdate (with or without flux). The phosphor can be prepared by direct thermal synthesis of ingredients comprising or yielding the oxides (e. g., $CaO$, $CdO$, $MoO_3$, $PbO$, $Sm_2O_3$), using aluminum fluoride in proportion of about 1 to 10 per cent as a flux, in which case it is advantageous to use a sulphate in the batch, such as sulphuric acid ($H_2SO_4$), or a sulphate that yields one or more of the oxide ingredients, like calcium sulphate, $CaSO_4$, or lead sulphate, $PbSO_4$, for instance. In this case, the batch may be heated in air at a temperature of the order of 800° to 1100° C. and for a period of ½ hour for a small batch of some 10 g.

However, we prefer to form and bring together the component molybdates for the phosphor by coprecipitation from a strong solution of calcium, cadmium, lead, and samarium salts or compounds, such as the nitrates $Ca(NO_3)_2$, $Cd(NO_3)_2$, $Pb(NO_3)_2$, $Sm(NO_3)_3$, by means of a solution of a molybdenum salt or compound, such as normal ammonium molybdate, $(NH_4)_2MoO_4$. The ammonium molybdate solution should contain enough free ammonia to completely neutralize the acid radicals of the nitrates and give a slight excess when the nitrate and ammonium molybdate solutions are poured together. The resulting metal molybdates percipitate together nearly quantitatively, and the precipitates may be filtered off, washed, mixed with flux such as some 1 to 10 per cent of aluminum fluoride, $AlFl_3$, and heated or fired in the air at temperatures of the order of 800° to 1100° C. and for a period of about ½ hour for a batch of some 10 g. For example, a triple molybdate phosphor to fluoresce pure yellow may consist of a precipitated batch comprising 1 mol $CaMoO_4$ and 0.2 mol $CdMoO_4$ with 1 to 10 per cent by weight of $PbMoO_4$, and may be fired at about 850° to 1100° C. Or a quadruple molybdate phosphor to fluoresce bright orange may consist of a precipitated batch of 1 mol $CaMoO_4$ and 0.2 mol $CdMoO_4$ with 5 per cent by weight of $PbMoO_4$ and 0.2 per cent by weight of $Sm_2(MO_4)_3$ —1 to 10 per cent by weight of $AlFl_3$ being added as flux—and may be fired at about 800° to 1100° C. In either case, the batch may be fired or calcined in air in a refractory crucible (as of silica or alundum) heated in a refractory electric muffle furnace for about half an hour to an hour, more or less.

Quenching the phosphor after firing does not improve its color or brightness; however, washing it in distilled water facilitates the breaking up of any slightly sintered material. After cooling, washing, and drying, the phosphor may be sieved through a screen of some 100 to 200 mesh, when it is ready for use. It may be applied to the lamp tube or envelope on which it is used with the aid of a carbonaceous binder in the usual way, though any grinding or ball-milling to incorporate the powder in the binder should preferably be brief.

Besides its color qualities and flexibility of color adjustment, the phosphor offers advantages of ease of preparation, low cost, saving of valuable material as compared with certain other phosphors of comparable color and brightness, and improved temperature stability. The materials used in preparing the phosphor should be of the high purity generally used for phosphors, and preferably of at least C. P. or reagent grade. When the phosphor is made by direct thermal synthesis of materials comprising or yielding oxides, these materials should preferably be of fine particle size, such as some 1–5 microns.

What we claim as new and desire to secure by Letters Patent of the United States is:

A fluorescent material consisting of calcium cadmium molybdate in molar proportions of cadmium to calcium of approximately 1:5 and containing an activator from the group consisting of lead in an amount of about .1–20 per cent by weight calculated as lead molybdate and samarium in an amount of about .1 per cent to about one per cent by weight calculated as samarium molybdate and mixtures thereof.

HERMAN C. FROELICH.
ANN R. HERSEY.

REFERENCES CITED

The following references are of record in the file of this patent:

UNITED STATES PATENTS

| Number | Name | Date |
|---|---|---|
| 1,602,594 | Sheppard | Oct. 12, 1926 |
| 2,049,765 | Fischer | Aug. 4, 1936 |
| 2,184,274 | Fonda | Dec. 26, 1936 |
| 2,210,780 | Servigne | Aug. 6, 1940 |